Oct. 26, 1965 B. K. BETZ 3,214,695

TIMING PULSE CIRCUIT EMPLOYING CASCADED GATED MONOSTABLES SEQUENCED AND CONTROLLED BY COUNTER

Filed March 28, 1962 3 Sheets-Sheet 1

INVENTOR.
B. KEITH BETZ
BY Henry L. Hanson
ATTORNEY

INVENTOR.
B. KEITH BETZ
BY Henry L. Hanson
ATTORNEY

Oct. 26, 1965 B. K. BETZ 3,214,695

TIMING PULSE CIRCUIT EMPLOYING CASCADED GATED MONOSTABLES SEQUENCED AND CONTROLLED BY COUNTER

Filed March 28, 1962 3 Sheets-Sheet 3

INVENTOR.
B. KEITH BETZ
BY Henry L. Hanson
ATTORNEY

United States Patent Office 3,214,695

Patented Oct. 26, 1965

3,214,695

TIMING PULSE CIRCUIT EMPLOYING CASCADED GATED MONOSTABLES SEQUENCED AND CONTROLLED BY COUNTER

Bernard Keith Betz, Hopkins, Minn., assignor to Honeywell Inc., a corporation of Delaware Filed Mar. 28, 1962, Ser. No. 183,296
13 Claims. (Cl. 328—63)

A general object of the present invention is to provide a new and improved electrical apparatus useful in controlling the operation of a digital electronic data processing apparatus. More specifically, the present invention is concerned with a new and improved electrical timing apparatus useful for controlling the sequencing of an electronic data processing apparatus wherein said apparatus is characterized by its ability to provide variable timing cycles which may be selectively controlled in terms of time duration with respect to the individual steps performed and wherein means are provided for selectively sequencing the apparatus in a manner that may be manually determined.

Electronic data processing systems are generally of the type which is arranged to carry out certain data processing functions in accordance with program orders or instructions which have been selected to be performed in a predetermined or prearranged pattern. The carrying out of any instructions, or a portion thereof, is generally accomplished in the associated electronic circuitry by way of time steps with each of the time steps being of a time duration which is related to the particular function then being performed. A series of these time steps is generally considered with respect to a fixed time interval which is sometimes referred to as the cycle time of the apparatus. The cycle time may relate, for example, to the time that it takes to move information with respect to a memory device associated with the data processing apparatus to a special storage register or manipulating register in the apparatus.

The cycling of the data processing system may well be carried out by way of a suitable electronic timer or clock which is adapted to provide timing signals for defining the beginning and end of any particular cycle as well as certain sub-cycles or portions of the main cycle. It is this type of timing apparatus with which the present invention is concerned. It has been found that the operation of a data processing apparatus, or the programs being performed thereby, may be checked by providing a timing clock which is capable of being manually cycled for a single cycle at a time and also being sub-cycled a single sub-cycle at a time. This facility in the apparatus permits a service engineer or operator to step the apparatus through a program order or instruction and examine what the apparatus is doing by way of performance during the course of these steps. This enhances the ability of the engineer or operator to localize weak components in the associated system or program errors and to perform other service checks. In addition, a further facility is provided in accordance with the teachings of the present invention to help check the operation of the associated apparatus. This further facility takes the form of means for providing timing signals from the timing clock wherein the timing signals are of a manually variable time duration with the timing variation being appropriately related to normal timing functions within the associated apparatus so that a failure may be forced upon an associated weak circuit or component.

It is therefore a further more specific object of the present invention to provide a new and improved timing apparatus for a data processing apparatus wherein the timing aparatus is of the type wherein the sequence of timing operations may be variably selected on a full-cycle basis or on a sub-cycle basis in the event that it is desirable to switch the timing apparatus from a free-running status.

Still another object of the present invention is to provide a new and improved timing apparatus for producing sequencing signals for a data processing apparatus wherein the time duration of the timing signals originating from the timing apparatus may be selectively varied so as to provide a facility for checking the marginal operating characteristics of associated electronics apparatus.

The principles of the present invention have been implemented by a novel and unique arrangement of electronic circuits which permit the timing functions to be carried out in a manner that lends itself to easy manual control of both the sequencing functions and the timing of the individual sequencing functions. Thus, the apparatus embodies a series of one-shot or single-shot pulse-producing circuits arranged in a series sequence with appropriate gating circuitry therebetween for ensuring that the sequence may be carried out in the desired order and that the sequence may be appropriately interrupted in the desired manner by manual means.

It is therefore a further object of the present invention to provide a new and improved sequencing apparatus comprising a series of one-shot or single-shot pulse producing circuits interconnected in a predetermined sequence by way of a plurality of logical gates so that the sequencing of any particular one-shot will not be initiated until the one-shot immediately preceding has completed its timing or switching operation.

Another more specific object of the present invention is to provide in accordance with the foregoing object a plurality of one-shot circuits wherein the time length of operation of any one or more of the one-shots may be selectively varied in terms of the switching times thereof.

Still another more specific object of the present invention is to provide a new and improved electrical timing apparatus in accordance with the principles of the foregoing objects wherein the outputs of a pair of one-shot circuits are gated together in a predetermined manner so that the output of the gating circuit will be an electrical pulse whose time length may be determined by the difference in switching times between the two one-shots.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
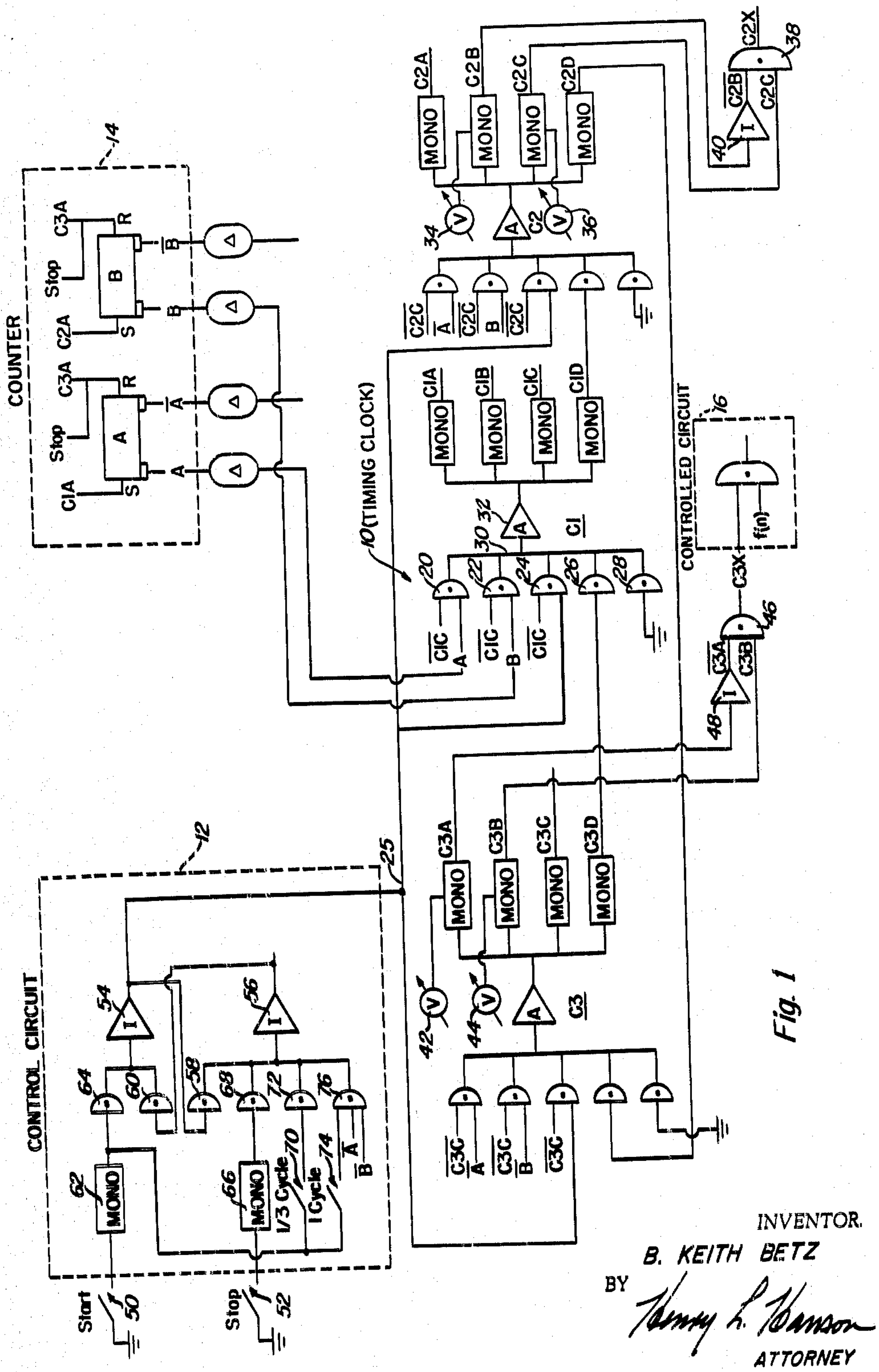
FIGURE 1 is a diagrammatic arrangement of the logical circuitry associated with a preferred embodiment of the invention.

The apparatus diagrammatically illustrated in FIGURE 1 comprises the basic timing clock or sequencer 10 which is adapted to receive its initiating and sequencing control signals by way of a control circuit indicated generally at 12. A counter circuitry 14 is also associated with the timing clock 10 for purposes of keeping track of the switching status of the clock. The output of the timing clock 10 is shown connected to an output logical AND gating circuit indicated generally at 16. The timing clock is so arranged that once it has been put in operation by way of signals derived from the control circuit 12, it will provide a series of timing or sequencing signals on the outputs thereof for application to an associated circuitry, such as indicated at 16. The counter 14 serves to provide signals which ensure the proper sequencing of the timer 10 as well as control signals which may be utilized to control the stepping of the timing clock 10 by way of the signals derived from the control circuit 12.

Considering the timing clock in greater detail, the clock illustrated is, in effect, a three-stage timing clock with the stages each being identified in the order of their operational sequence as C1, C2 and C3. The timing stage C1 comprises a series of input AND gates 20, 22, 24, 26 and 28. The outputs of these gates are buffered together on a buffer line 30 which in turn is adapted to be connected to the input of a driver stage 32. This driver stage is connected on its output to provide driving signals for a series of one-shot pulse-producing circuits whose assertion output signals are identified as C1A, C1B, C1C and C1D.

The timing stage C2 embodies the same basic circuitry as set forth above for the timing stage C1. Thus, there is a series of input gates buffered together on the input of the driver circuit which in turn feeds a series of one-shot timing circuits, the timing circuits in this case being identified by their assertion output signals C2A, C2B, C2C and C2D. In this particular series of one-shot circuits, a variable voltage source 34 and a further variable voltage source 36 are shown connected to the respective one-shot circuits C2B and C2C. A timing signal output gate 38 is connected to receive signals from the one-shot circuits C2B and C2C, the output of the one-shot circuit C2B being passed through a suitable inverter 40 to provide the desired signal polarity on the input of the gate 38.

The timing stage C3 takes a form similar to that described above with respect to the timing stages C2 and C1. Thus, there is a series of input gates buffered together on the input of a driver stage which in turn feeds a plurality of one-shot timing circuits. The timing circuits in this instance are identified by the assertion output signals C3A, C3B, C3C and C3D. Variable voltage sources 42 and 44 are provided for the one-shot timing circuits C3A and C3B respectively. An output gating circuit 46 is provided to receive signals from the one-shot timing circuits C3A and C3B. An inverter 48 is provided for converting the output signal from the timing circuit C3A to the desired polarity for control purposes on the output of the gate 46.

The control unit 12 comprises a bistable circuit which is adapted to be switched between its set and reset state in accordance with manually derived input signals from a start switch 50 and a stop switch 52. The bistable circuit is formed using a pair of inverters 54 and 56 which have input logical gates connected to the input thereof, with one each of these logical gates being assigned to function as a feedback or cross-coupling gate for the output of the other inverter. Thus, the output of the inverter 54 is cross-coupled to an input gate 58 whose output is buffered to the input of the inverter 56. Similarly, the output of the inverter 56 is cross-coupled to the input of a gate 60 which is buffered to the input of the inverter 54. The starting input circuit derived from the switch 50 is appropriately shaped in a pulse-shaping circuit indicated generally at 62 with the output thereof being applied to a further input gate 64 on the input of the inverter 54. The other input gates to the inverter 56 are gates utilized for purposes of stopping the clock timer 10 by way of a resetting operation on the bistable circuit under discussion. Thus, the stop switch 52 feeds through a suitable pulse-shaping network 66 to a gate 68 which is buffered to the input of the inverter 56. A one-third cycle control switch 70 is coupled to the input of a further gate 72 while a single or one-cycle switch 74 is coupled to the input of a further gate 76, the latter two gates being buffered together on the input of the inverter 56. It will also be noted that the gate 76 has two additional inputs and these inputs are derived from the counter circuit 14.

The counter 14 comprises a pair of bistable circuits A and B, each of which has a set input and a reset input. The sequencing of this counter circuit is determined by the timing signals derived from the timing clock 10 by way of the signals C1A, C2A and C3A. The assertion outputs A and B and the negation outputs $\overline{A}$ and $\overline{B}$ are shown connected to the input gates of the respective counter stages C1 through C3 by way of suitable delay circuits. The delay circuits serve to delay the effects of a switching within the timing circuit sufficiently to ensure that a false sequencing is not initiated in the timing circuit 10. Further, when the stop switch 52 is operated, a reset signal is adapted to be applied to each of the A and B bistable circuits to reset these circuits for a further operation.

The operation of the apparatus illustrated in FIGURE 1 may best be understood following a consideration of the functioning of each of the individual parts constituting the apparatus. The timing stage C1 is considered first in its static or stopped condition. For purposes of consideration of the operation, the inactive state of any circuit is considered to be that state wherein the output is of a first predetermined potential, hereinafter considered to be ground or zero potential. Any circuit which is considered active is assumed to have an output voltage of —V. In one embodiment of the invention, —V was selected to be —5 volts. In the static or stopped condition in the timing stage C1, each of the one-shot circuits C1A, C1B, C1C and C1D is inactive on its assertion output lines. Consequently, the negation of the output of these one-shots will be active so that the signal $\overline{C1C}$, appearing in the input of the gates 20, 22 and 24, will all be at a —V potential. The switching of the one-shots will occur only upon the input signal going from a —V potential to ground.

In the static condition, the counter 14 is assumed to be in the reset state so that the outputs A and B will both be inactive and consequently will be at ground potential. Thus, the signals A and B coupled to the input gates 20 and 22 will be at ground. The output from the C3D circuit of timing stage C3 will also be assumed to be in the inactive state so that the assertion line from this one-shot on the input gate 26 will be at ground or zero potential. Similarly, the gate 28 has its input connected to ground.

The gate 24 which has the negation input from the C1C one-shot will have its particular input at a —V potential. The output from the control circuit 12 by way of line 25 in the static state is assumed to be also at a —V potential. Under these conditions, the only gate which in effect is coupling a signal to the buffer line 30 will be the gate 24, and the buffer line 30 will be maintained at a —V potential.

The driver 32, which is associated with the buffer line 30, is assumed to be of the type that will remain in the static state so long as the potential input thereto is at a —V potential. The driver 32 is further assumed to be of the type that when the potential on the input thereof is switched from a —V to 0 or ground, the driver will produce an output signal which will be used to activate the one-shot circuits connected to the output thereof so that they will go through their respective timing functions. The activation of each of the one-shot circuits will cause the assertion output to switch from ground to a —V potential for the timing period of the circuit.

An examination of each of the other timing stages C2 and C3 will indicate that these timing stages each has its respective input buffer lines maintained at a —V potential under static conditions. As long as the —V potential remains on these buffer lines, each of the respective drivers will be inactive and consequently the one-shot circuits connected to the outputs of the drivers will all be in the inactive state.

In order to initiate the free running of the timing clock 10, it is necessary to close the start switch 50 which, in turn, will activate the pulse-producing circuit 62. This circuit will be effective to produce a pulse passing through the gate 64 and the inverter 54 to cause the potential on the output line 25 of the control unit 12 to switch from a —V potential to ground. When the output from the inverter 54 switcthes from a —V to ground potential, this will be fed not only to the input of each of the timing stages, as discussed hereinafter, but also to the gate 58 on the input of the inverted 56. This will cause the inverter 56 to switch its output from a ground potential to a —V potential which, in turn, will be coupled over to the gate 60 of the input of the inverter 54. Consequently, the bistable circuit in the control unit 12 will lock into this state with the output line 25 being at ground potential.

The switching of the potential from a —V to ground on the line 25 will be effective to produce a control action only in the timing stage C1. The gate which will be responsive to this change will be the gate 24 which, as explained above, is normally open to maintain a —V potential on the buffer line 30. When the potential on the line 25 switches to ground, the gate 24 will close and the potential on the buffer line 30 will go from —V to ground potential. When this occurs, the driver 32 will be activated and will produce an initiating pulse for each of the one-shots connected to the output thereof so that now the output lines C1A, C1B, C1C and C1D will become active at a —V potential.

The —V potential appearing on the C1D line will serve to pass through the input gate on the next timing stage C2 to hold the buffer line on the input of the driver stage at a —V potential. Prior to the —V potential appearing on the buffer line in this second stage, the line was maintained at a —V potential by the signals $\overline{A}$ and $\overline{C2C}$ on the upper input gate. It will be noted that when the one-shot output signal C1A becomes active, the counter 14 will be switched so that the flip-flop A will switch from the reset state to the set state and the output $\overline{A}$ will go from the —V potential to ground and the output A will go from ground potential to —V. The switching of the signal $\overline{A}$ from —V to ground will have no effect on the input of the driver in stage C2 since the output buffer line will have been tied to a —V potential by way of the output of the signal C1D.

Figure 2:
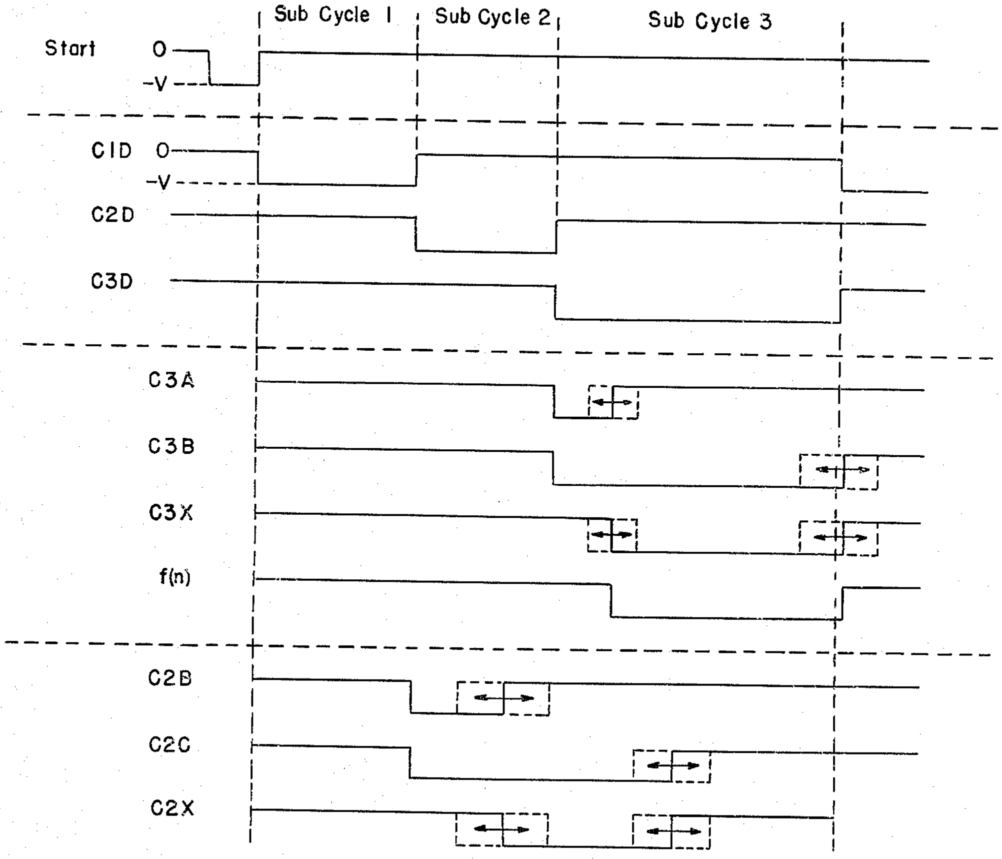
FIGURE 2 illustrates waveforms of the type associated with apparatus such as shown in FIGURE 1.

As illustrated in FIGURE 2, the signal C1D initiates its switching function from ground to —V potential when the start signal has switched from —V potential to ground. The signal C1D will stay at the —V potential for a predetermined period of time, which is independent of any of the other circuit parameters except those parameters within the associated one-shot circuit, until the end of the first sub-cycle, indicated as sub-cycle 1. At this time, the signal C1D switches from the —V potential back to ground. By the time that the signal C1D switches from —V potential to ground, the C1D signal will be the only one holding the input buffer line in the timing stage C2 at a —V potential. When that potential switches from a —V to ground on the buffer line, the driver D in the timing stage C2 will then activate the one-shot timing circuit connected to the output thereof. When this occurs, the first timing sub-cycle will have been completed and the second sub-cycle will have been initiated, as indicated by the signal C2D in FIGURE 2, switching from zero to —V potential.

As soon as the second timing stage C2 is operative, the one-shot circuit C2A will have its output connected to switch the counter stage B from the reset state to the set state. With both of the counter stages A and B in the set state, the output $\overline{A}$ and $\overline{B}$ will be inactive so that the timing stages C3 will now be conditioned for operation. In view of the fact that the signal C2D is active at a —V potential, this signal will maintain the buffer line on the input of the driver in timing stage C3 in a —V potential.

The timing for the second sub-cycle, or sub-cycle 2 as indicated in FIGURE 2, will be dependent upon the time that it takes for the one-shot signal C2D to go through its timing cycle and complete its switching operation by going from a —V potential to ground. When this occurs, the potential on the buffer line on the input of the driver of timing stage C3 will switch from a —V potential to ground and the third timing cycle, or sub-cycle 3 will be initiated with the driver D in timing stage C3 firing its respective one-shot circuits.

When the one-shot circuit C3A operates, the output thereof will be coupled to the counter 14 so that each of the flip-flops A and B will be switched to the reset state. Further, when the one-shot circuit C3D operates, it will provide a —V potential on the input gate 26 of the timing stage C1, and this will hold the buffer line 30 at a —V potential so that the timing stage C1 will remain inactive. As soon as the signal C3D has switched back from the —V potential to ground, the timing sequence, or total cycle of the timing clock 10, will have been completed as indicated in FIGURE 2.

When the signal C3D switches back from a —V potential to ground, a second timing cycle will be initiated with the driver 32 being effective to drive its output one-shot circuits for a further cycle. This cyclic operation will continue in a manner that is effectively free-running until such time as an operator manually intervenes, or some other automatically operative circuit creates a stop signal on the input of the control unit 12.

When a stop signal is created by way of the closing of the switch 52, for example, a signal from the pulse-producing circuit 66 will pass through the gate 68 to cause the output of the inverter 56 to switch from a —V potential to ground on its output. Concurrently, the signal will be cross-fed to the gate 60 where the inverter 54 will be caused to reverse its potential and switch from ground to a —V potential. With a —V potential existing on the line 25, any gate having this line connected thereto, with the associated negation input also being at a —V potential, will be effective to lock the associated output buffer line at a —V potential so as to prevent activation of the driver connected thereto. On the appearance of the stop signal on the counter 14, the flip-flops A and B will be switched to the reset state so that now the circuit will be conditioned for initiating the next operating cycle from a condition established by the reset state of the counter 14. Thus, the next cycle will start at the timing stage C1.

During the normal operation of the timing clock 10, it is intended that the output signals from the respective one-shot circuits making up this timing clock be utilized in various and sundry ways in associated pulse-handling circuitry. Thus, in the timing stage C1, the output signals from the one-shot circuit C1B may be utilized in some external circuit, not shown, for purposes of gating a particular logical function associated with a data processing operation. The gating function might be associated with either the assertion or the negation output of this circuit in a manner well known in the art.

Another way in which the output may be utilized to take particular advantage of the teachings of the present invention is illustrated in connection with the timing stage C2. In this regard, each of the one-shot circuits C2B and C2C is indicated to have variable voltage inputs 34 and 36 respectively. The output signal for the one-shot C2B is assumed to be as indicated at FIGURE 2. In this regard, the output will become active at the beginning of the sub-cycle 2 and will remain active for a period of time which is dependent upon the internal timing functions of the one-shot circuit. By applying a variable voltage to an input of the timing circuit, it is possible to vary the time at which the circuit returns from the active state back to the inactive state as indicated by the variable dotted lines appearing in FIGURE 2 for C2B.

Similarly, the timing of the one-shot C2C is also assumed to be variable by way of its associated variable voltage source 36. The net effect of this variation is again indicated in FIGURE 2 for the signal C2C with the variations appearing as the dotted lines.

It will be seen that the outputs of the one-shots C2B and C2C are connected to the input of the gating circuit 38 with an inverter 40 appearing in the output of the line C2B. With this particular logic on the input of the gate 38, the gate will be opened only during the time that the negation of the signal C2B is active and the insertion of the signal C2C is active with the resultant output signal appearing at C2X, as indicated in FIGURE 2. Thus, the starting or leading edge of the signal C2X will be dependent upon the time in which the trailing edge of the signal C2B occurs. Further, the trailing edge of the signal C2X will be determined by the trailing edge of the signal C2C. Thus, it will be readily apparent that the adjustment of the voltage source 34 and voltage source 36 may determine the total time at which the output signal C2X appears as an active function.

The output of the timing stage C3 by way of the one-shot signals C3A and C3B is handled in a similar manner to that described above with respect to the gate 38. Thus, the output signal C3A passes through an inverter 48 where the output appears as a negation signal on the input of the gate 46. This signal is gated with the assertion signal C3B. Inasmuch as variable voltage sources 42 and 44 are provided on respective inputs of these one-shot circuits, the signals C3A and C3B may be varied in their time duration in the manner indicated in FIGURE 2. Because of the manner in which the signals are gated together on the input of the gate 46, the output signal C3X may be varied in its time duration both on its leading edge and trailing edge to correspond to the variations in timing produced in the signals C3A and C3B. It will be noted in this instance that the output signal C3X is shown gated into an output logical gate 16 having a further input function $f(n)$. This latter signal is also shown in FIGURE 2.

It has been found that a very effective marginal checking of the operation of an output logical gate, such as illustrated at 16, may be carried out by varying the time duration of the input timing clock signal, such as the signal C3X. Thus, if the timing signal is decreased in the total amount of time in which it is applied to the input of the gate 16, a point will eventually be reached where the circuit will no longer be opened by the presence of the timing signal and the input signal. In the event that any of the components associated with this gating circuit are weak or marginal in their operability, the dropout or closing of this particular gate as a functioning unit will occur at a point that may be specifically related to a weakening or marginal operating characteristic of the circuit. This marginal checking may be related not only to the variation of both the leading and the trailing edges of the timing pulse, but to a variation of either the leading edge or the trailing edge. In any event, a timing variation within certain determined limits will normally produce no failure within the circuit if all of the components therein are operating in accordance with their desired design characteristics. A circuit failure within those predetermined limits would indicate to an operator that a component should be replaced before further use is made of the circuitry.

Another facility provided in the present circuitry to aid in the maintenance and use of the equipment is a facility for cycling the timing clock 10 a single cycle at a time or a sub-cycle at a time. This facility permits an operator to step through a program a cycle or sub-cycle at a time in order to localize an area where a particular program may be breaking down or failing.

When is is desired to operate the circuit under the one-third-cycle, or sub-cycle control, the one-third-cycle switch 70 in the control unit 12 is closed. The closing of this particular circuit will effect a connection between the output of the pulse circuit 62 and the input of the gate 72. Thus, when the start signal is created by way of the closing of the switch 50, the output of the pulse-producing circuit 62 will be effective to apply a pulse to both the gates 64 and 72. The presence of the start pulse on both the gate 64 and the gate 72 is to produce an output pulse in the output line 25. The input pulse will be of sufficient duration to ensure that the bistable circuit in the control circuit 12 will not change its bistable state. When this happens, the timing stage C1 will be effective to fire its respective one-shot timing circuits. When the timing of these circuits has been completed, the circuit 10 will once again be in a stopped condition with the timing stage C2 being conditioned to operate next. This stage C2 will not fire until such time as a further pulse appears from the control circuit 12 by way of the line 25 to cause the signal on the buffer line on the input of the driver to switch from a —V potential to ground. The switching will cause the driver to operate and activate the respective one-shot timing circuits on the output thereof. Once again, upon the completion of the operation of the one-shots in this timing stage C2, the circuit will be locked up in a stopped condition until such time as a further start signal is received from the control unit 12. When this occurs, the timing stage C3 will operate and go through its timing cycle, at which time the circuit will be back where it started and will be in a static or stopped condition. It will thus be readily apparent that an operator using this facility can step the associated apparatus through its various sub-cycles and examine those particular areas which may be associated with a particular sub-cycle of operation to determine where there is a circuit failure or a program failure.

In the event that the operator wants to single-cycle the system, he will close the switch 74 in the control unit 12. It will be noted in this connection that the switch 74 connects the output of the pulse circuit 62 to one of the input gate legs of the gate 76. Inasmuch as the negation output of the flip-flops A and B from the counter 14 are also connected to input gate legs on the gate 76, it will be apparent that the gate 76 will be open only when all three conditions are satisfied. Thus, when an input start pulse is derived from the pulse-producing circuit 62, this pulse will operate in the normal manner to pass through the inverter 54 and switch the bistable state of the circuit so that the output on line 25 switches from a —V potential to ground. Due to the cross-coupled feedback in the bistable circuit, this condition will prevail until such time as a signal is created on the gate 76 to switch the circuit back into the reset state. It will be apparent that this reverse switching will occur only after the counter 14 has been switched, to indicate that the timing stage C3 has been operated.

When the timing stage C3 operates, the negation outputs $\overline{A}$ and $\overline{B}$ from the counter 14 will appear on the input of the gate 76 so that the —V potential appearing on the output of the pulse circuit 62 may be coupled to the gate 76 to reset the bistable circuit in the control unit 12. In other words, a start signal originating from the closing of the switch 50 will appear as an initiating signal on the line 25 on the input of the timing stage C1. The normal sequence of timing functions will follow from C1 through C2 and then through C3. Upon the firing of stage C3, particularly in the one-shot circuit C3A, the counter 14 flip-flops A and B will both be reset and the negations thereof will become active so that a signal will pass through the gate 76 to switch the signal on the line 25 back to a —V potential. Thus, the gate 24 on the input of the timing stage C1 will pass a —V potential to the buffer line 30 to hold the circuit in that state until such time as the signal on the line 25 is once again switched from a —V potential to ground. Thus, each individual closure of the start switch 50 will be effective to cause the timing clock 10 to cycle through each of its three sub-cycles back to the start state in preparation for the next start signal produced by the closing of the switch 50.

It will be readily apparent that the principles of the present invention may be applied to various types of timing clocks wherein, for example, additional one-shot circuits are provided or additional timing stages are arranged to operate in parallel.

Figure 3:
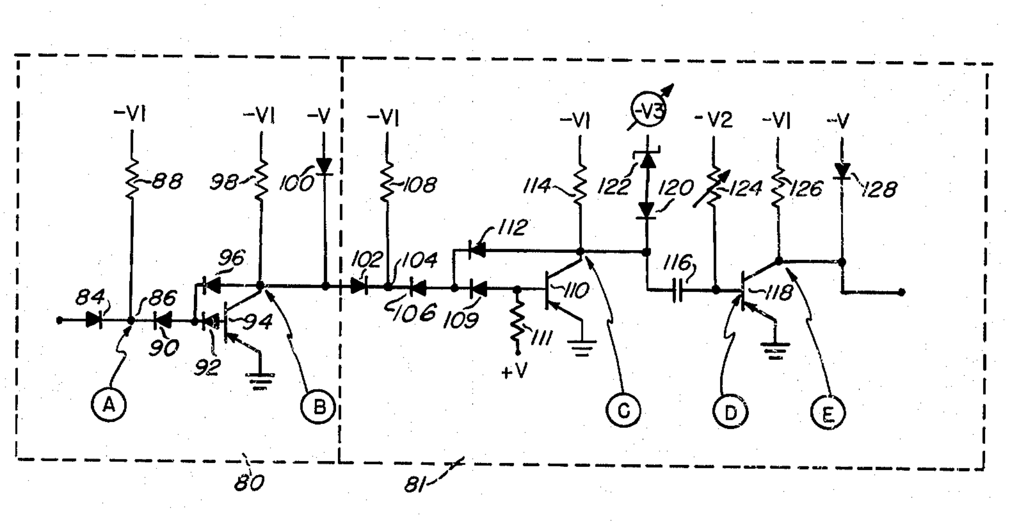
FIGURE 3 is a schematic showing of a preferred form of a one-shot circuit that may be employed in the invention.

A representative and preferred form of driver and one-shot timing circuit is illustrated in FIGURE 3. In this figure, that portion of the circuit within the dotted enclosure 80 is considered the driver portion of the circuit, while that portion of the circuit within the enclosure 81 is the one-shot timing circuit. The driver portion of the circuit includes an input gating circuit in the form of a diode 84 connected to a point 86 which is the junction between a resistor 88 and a noise threshold diode 90. Resistor 88 is coupled to a —V1 potential. The noise threshold diode 90 is coupled to a further diode 92 to the base of a transistor 94, the latter also having the usual emitter and collector electrodes. A back clamp diode 96 is connected from the collector of the transistor 94 back to the junction between the diodes 90 and 92. This diode 96 serves to prevent the collector potential from reaching that on the base of transistor 94 and thus the transistor is held out of saturation and avoids a turn-off switching delay in the transistor. A resistor 98 couples the collector of a transistor 94 to a —V1 potential source. A clamp diode 100 is connected to the collector of the transistor 94 and functions to maintain the potential at the collector at a —V potential in the absence of conduction in the transistor 94. The output of the transistor 94 is taken from the collector which is coupled through a disconnect diode 102 into the one-shot circuit.

The one-shot circuit 81 will be seen to have an input path by way of the disconnect diode 102 which leads to a junction 104 between a noise threshold diode 106 and a resistor 108, the latter of which is connected at one end to the —V1 power supply terminal. The output of the diode 106 is coupled by way of a further diode 109 to an input base electrode on a further transistor 110, the latter of which also includes emitter and collector electrodes. The base of the transistor 110 is connected to a +V potential signal by way of a resistor 111. A back clamp diode 112 couples the collector of transistor 110 back to the junction between the diodes 106 and 109. Power for the transistor 110 is supplied by way of a resistor 114 which is connected at its opposite end to the —V1 power supply terminal. Transistor 110 is connected to a charging and discharging circuit of a condenser 116. The condenser 116 is in turn coupled to the input base of a further transistor 118, the latter also having the usual emitter and collector electrodes. A charging circuit for the condenser 116 is by way of the base-emitter circuit of the transistor 118 and resistor 114. A pair of series-connected diodes 120 and 122, the latter a Zener-type diode, serve as clamp diodes to limit the voltage at C to the potential of the clamp voltage source shown as a variable —V3 potential. The diode 120 functions as a blocking diode to prevent positive going signals at the collector of transistor 110 from being shunted through the forward low impedance path of Zener diode 122. A discharge circuit for the condenser 116 includes a variable resistor 124 and the emitter-collector circuit of the transistor 110. The power supply signal —V1 for the transistor 118 is applied thereto at the collector electrode by way of the resistor 126. The lower end of the resistor 126, and consequently the collector of the transistor 118, is clamped to the —V potential by way of a clamp diode 128.

Figure 4:
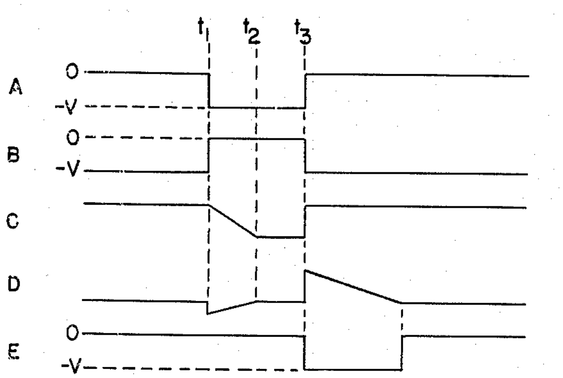
FIGURE 4 illustrates waveforms illustrative of the principle of operation of FIGURE 3.

The operation of the circuit of FIGURE 3 may be understood by reference to the waveforms illustrated in FIGURE 4 wherein the numerals adjacent each waveform relate to the particular electrical circuit location identified in FIGURE 3. Thus, referring to the waveform A in FIGURE 4, the signal will be seen to go from ground or zero potential to a —V potential at time $t_1$. In terms of the circuitry which has been described in connection with FIGURE 1, this time will correspond to the time when a ground condition on one of the buffer lines on the input of one of the drivers is switched from ground potential to a —V potential. Once the potential at this point is switched to a —V potential, the transistor 94, which is normally non-conducting, is switched into a conducting state so that the potential on the collector thereof is connected effectively to ground. Consequently, the signal indicated at B in FIGURE 4 shows that the potential at point B switches from a —V potential to ground at time $t_1$. When this occurs, the transistor 110, which is normally conducting, will be switched into a non-conducting state so that the condenser 116 will begin to charge, with the charging circuit therefor being by way of the emitter-base circuit of transistor 118, the condenser 116, and resistor 114 to the —V1 potential source. The charging of condenser 116 will continue until such time as the clamp voltage of the combined diodes 120 and 122 has been reached which, in FIGURE 4, is indicated at time $t_2$. The waveform at D in FIGURE 3 will be as indicated at D in FIGURE 4 with the potential at the base leveling off when the clamp level on the other side of the condenser 116 has been reached and the charging has stopped.

At time $t_3$, it is assumed that the input signal switches from a —V potential to ground as indicated in the wave form at A in FIGURE 4. At this time, the transistor 94 will be switched back to its normally non-conducting state and the transistor 110 will be switched into a conducting state to establish a discharge path for the condenser 116. The discharge path in this instance will be by way of the emitter-collector circuit 110, the condenser 116, and the resistor 124. The discharging of the condenser 116 will put a positive bias on the base of the transistor 118 so that this transistor will be switched to be non-conducting. Thus, the potential on the collector thereof will switch from an essentially ground potential to a —V potential as determined by the clamp diode 128 and the potential —V. This signal is illustrated at E in FIGURE 4. As soon as the condenser 116 has discharged sufficiently, the potential on the base of the transistor 118 will be switched back to the conductive region so that the transistor 118 will once again conduct and the potential at the collector will once again return to ground potential.

The time that it takes for the output potential on the collector of the transistor 118 to switch from a ground to the —V state and then back again to the ground state will be dependent upon the time constant of the RC circuit including the resistor 124 and condenser 116, as well as the extent that the condenser has been charged, as determined by the clamp voltage on the collector of transistor 110. In one embodiment of the invention, it was found desirable to vary this timing by way of the variation of the voltage source —V3 rather than by way of the resistor 124, although either or both methods may obviously be incorporated. The voltage variation produced will correspond to the voltage variations discussed above in connection with the voltage variation in the sources 34, 26, 42 and 44 in the timing clock one-shots of FIGURE 1.

It will be apparent that other forms of one-shot circuits may well be incorporated within the principles of the present invention so long as the general operating characteristics are maintained compatible with the principles set forth above in connection with the operation of FIGURE 1.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure by Letters Patent is:

1. Apparatus for timing the operation of a data processing system comprising a plurality of one-shot timing circuits, each of which is to be switched into an active state for a predetermined period of time in accordance with the operating characteristics thereof and each of which has an input and an output, means coupling an output of each of said timing circuits to an input of another one of said timing circuits so that said timing circuits are connected in a closed ring, means for initiating in each of said timing circuits its predetermined timing period following the termination of the timing period in the preceding timing circuit, said last named means including a counter having inputs connected to each of said timing circuits and means further connecting the output of said counter to the inputs of said timing circuits, starting means coupled to one of said timing circuits and means including said counter activated upon the occurrence of a pulse from said starting circuit to initiate the switching of the next one of said plurality of timing circuits so that a repetitive cyclic operation around said ring may be effected.

2. A cyclic timer comprising a plurality of separate timing stages connected serially in a closed loop, each of said timing stages having a plurality of input gates buffered together and an output comprising at least one one-shot switching circuit with the output of said switching circuit being connected to an input gate of a further one of said plurality if timing stages, a counter having inputs connected to said plurality of timing stages to indicate the switching status thereof, and means connecting the output of said counter to selected input gates of said plurality of timing stages to control the sequencing thereof.

3. Apparatus for producing a variable timing pulse for a logical gate comprising a pulse signal source, a pair of one-shot switching circuits connected to be activated by a pulse from said signal source, each of said switching circuits having means connected thereto to vary the time each circuit is activated, a control gate having inputs from each of said switching circuits so that when one of said circuits has finished switching said control gate will open and when the other of said circuits has finished switching said control gate will close, and means connecting the output of said control gate to the input of said logical gate.

4. A cyclic timer comprising a plurality of separate timing stages connected serially in a closed loop, each of said timing stages having a plurality of input gates buffered together and an output comprising a plurality of one-shot switching circuits, means connecting the output of one of said plurality of one-shot switching circuits of each timing stage to an input gate of a further stage, a counter having inputs thereof connected to said plurality of timing stages to indicate the switching status thereof, and means connecting the output of said counter to selected input gates of said plurality of timing stages to control the sequencing thereof.

5. A cyclic timer as defined in claim 4 wherein at least two of said one-shot switching circuits have their outputs connected to a logical AND gate, and means connected to said one-shots to vary the switching time thereof to vary the time duration of the pulse on the output of said logical AND gate.

6. Apparatus for timing the operation of a data processing system comprising a plurality of one-shot timing circuits, each of which is to be switched into an active state for a predetermined period of time in accordance with the operating characteristics thereof and each of which has an input and an output, means coupling an output of each of said timing circuits to an input of another one of said timing circuits so that said timing circuits are connected in a closed ring, means for initiating in each of said timing circuits its predetermined timing period following the termination of the timing period in the preceding timing circuit, said last named means including a counter having inputs connected to each of said timing circuits and means further connecting the output of said counter to the inputs of said timing circuits to control the sequencing of said timing apparatus, starting means coupled to one of said timing circuits to initiate a switching of said circuit for its predetermined period of time, and means including said counter to initiate the switching of the next one of said plurality of timing circuits so that a repetitive cyclic operation around said ring may be effected, said starting means comprising a bistable circuit to be switched into a first bistable state upon the application of a start signal and into a second bistable state upon the application of a stop signal.

7. Apparatus as defined in claim 6 wherein said bistable circuit has a control means connected thereto, said control means when actuated maintaining said bistable circuit in said second bistable state when a start signal is coupled to said input and comprising gating means connecting said input signal to both a set and reset input on said bistable circuit.

8. In combination, first apparatus for producing a variable timing pulse for a logical gate comprising a pulse signal source, a pair of one-shot switching circuits connected to be activated by a pulse from said signal source, each of said switching circuits having means connected thereto to vary the time each circuit is activated, a control gate having inputs from each of said switching circuits so that when one of said circuits has finished switching said control gate will open and when the other of said circuits has finished switching said control gate will close, means connecting the output of said control gate to the input of said logical gate, a second apparatus for producing a variable timing pulse for a further logical gate, and means connecting the output of said first apparatus to the input of said second apparatus to activate said second apparatus following the operation of said first apparatus.

9. A cyclic timer comprising a plurality of separate timing stages connected serially in a closed loop, each of said stages having a plurality of input gates buffered together and an output comprising at least one one-shot switching circuit with the output of said switching circuit being connected to an input gate of a further stage, a counter having inputs connected to each stage of said timer to indicate the switching status of said timer, and means connecting the output of said counter to selected input gates of said stages to control the sequencing of said timer.

10. A timer as defined in claim 9 wherein a pulse-producing starting circuit is connected to an input gate of each of said stages, means including said counter connected to input gates of each of said stages to maintain all but one of said stages inactive upon the occurrence of a pulse from said starting circuit.

11. A timer as defined in claim 10 wherein said pulse-producing starting circuit comprises a bistable circuit having a set input and a reset input, a plurality of gates connected to said reset input, first switch means connecting the set input of said circuit to the reset input by way of a first one of said plurality of gates, a second switch means connecting said set input by way of a second one of said plurality of gates to said reset input, and means connecting output signals from said counter to open said second one of said gates to reset said circuit when said counter indicates said timer has sequenced to a predetermined state.

12. Apparatus for producing a variable timing pulse for a logical gate comprising a pulse signal source, a pair of switching circuits connected to be activated by a single input from said signal source and each connected to switch from a first to a second state for separate predetermined periods of time, each of said switching circuits having means connected thereto to vary the time each circuit is switched from the first to the second state, a control gate having inputs from each of said switching circuits so that when one of said circuits has finished switching said control gate will open and when the other of said circuits has finished switching said control gate will close, and means connecting the output of said control gate to the input of said logical gate to provide a clocking signal for said gate and a means for marginal-checking the operation of said gate.

13. In combination, a logical signal gating circuit, said circuit having as an input at least one logic representing signal input and a timing signal input, a timing signal source comprising a pulse-producing circuit, first means connected to said pulse-producing circuit to vary the time occurrence of the leading edge of the pulses produced thereby, second means connected to said pulse-producing circuit to vary the time occurrence of the trailing edge of the pulses produced thereby and means connecting the output of said timing signal source to said timing signal input.

References Cited by the Examiner

UNITED STATES PATENTS

| | | | |
|---|---|---|---|
| 2,536,917 | 1/51 | Dickinson | 328—109 |
| 2,723,080 | 11/55 | Curtis | 328—95 |
| 2,933,625 | 4/60 | Townsend et al. | 307—88.5 |
| 2,984,789 | 5/61 | O'Brien | 328—43 |
| 3,029,389 | 4/62 | Morphet | 328—63 |
| 3,047,841 | 7/62 | Kondi | 328—63 |
| 3,048,714 | 8/62 | Poole | 307—88.5 |
| 3,083,306 | 3/63 | Lindstrom et al. | 307—88.5 |

ARTHUR GAUSS, *Primary Examiner.*

BENNETT G. MILLER, *Examiner.*